United States Patent

Dugge et al.

[11] 4,323,096
[45] Apr. 6, 1982

[54] COMBINATION VACUUM RELIEF VALVE AND PRESSURE RELIEF VALVE WHICH ARE PROTECTED FROM THE ATMOSPHERE

[75] Inventors: Richard H. Dugge, St. Louis; Dallas W. Rollins, St. Charles, both of Mo.

[73] Assignee: ACF Industries, Incorporated, New York, N.Y.

[21] Appl. No.: 150,469

[22] Filed: May 16, 1980

[51] Int. Cl.³ .............................................. F16K 17/26
[52] U.S. Cl. ................................. 137/350; 137/493.1; 137/493.7; 137/493.8; 137/588; 105/280
[58] Field of Search ............... 137/526, 587, 588, 589, 137/350, 493, 493.8, 493.9, 493.7; 105/280

[56] References Cited

U.S. PATENT DOCUMENTS

| | | | |
|---|---|---|---|
| 1,578,766 | 3/1926 | Schwemlein | 137/526 X |
| 1,897,076 | 2/1933 | Shand | 137/526 X |
| 1,923,503 | 8/1933 | Raines | 137/493.8 |
| 2,116,769 | 5/1938 | Schroeder | 137/493.8 |
| 2,169,410 | 8/1939 | Drane | 137/526 X |
| 2,732,856 | 1/1956 | Jurs et al. | 137/526 X |
| 3,260,224 | 7/1966 | Pettit et al. | 220/334 X |

Primary Examiner—William R. Cline
Attorney, Agent, or Firm—Henry W. Cummings

[57] ABSTRACT

A vacuum relief valve assembly includes a vacuum valve member located below a top cover plate and is thus protected from the atmosphere. First passageways defined in part by a bottom cover plate provide communication between the outside atmosphere and the lower surface of the valve. Second passageways provide communication between the upper surface of the valve and the inside of the container. When the pressure in the container is below atmospheric, atmospheric pressure acting on the bottom of the valve lifts the valve and air flows through the first and second passageways until atmospheric pressure is reached in the tank. A pressure relief valve is mounted for pivotal movement relative to an opening providing communication between the pressure in the tank and the first passageways to vent pressure in the tank. The pressure relief valve is protected from the atmosphere by the top cover plate, and in one embodiment, by the vacuum relief valve.

10 Claims, 5 Drawing Figures

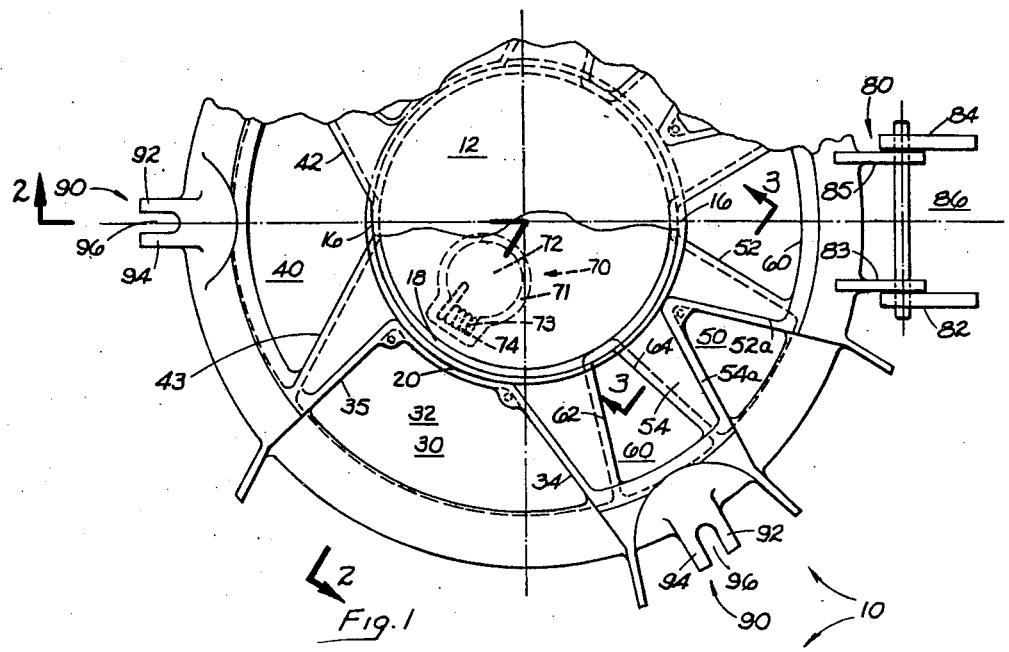
Fig. 1
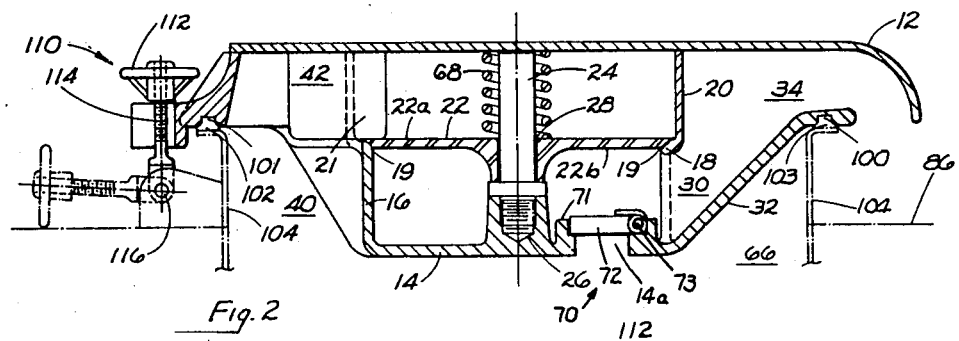
Fig. 2
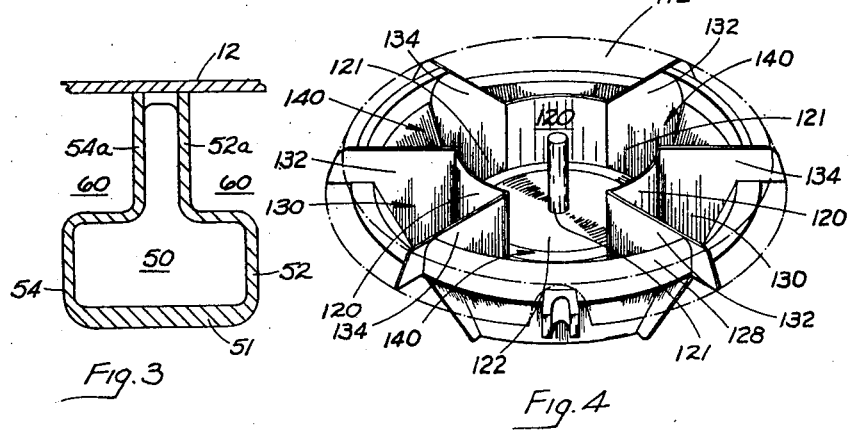
Fig. 3
Fig. 4

COMBINATION VACUUM RELIEF VALVE AND PRESSURE RELIEF VALVE WHICH ARE PROTECTED FROM THE ATMOSPHERE

BACKGROUND OF THE INVENTION

U.S. Pat. No. 1,578,766 discloses a combination vacuum relief valve and pressure relief valve in which both the vacuum relief valve and the pressure relief valve are located below a top cover plate. A bottom cover plate is movable vertically to relieve a predetermined pressure in the tank above atmospheric.

In application Ser. No. 932,796 filed Aug. 11, 1978 a vacuum relief valve is disclosed in which first passageways providing communication between the outside atmosphere and the lower surface of the vacuum relief valve have a cross-sectional area equal to the cross-sectional area of the vacuum relief valve and equal to the cross-sectional area of second passageways providing fluid communication between the top surface of the vacuum relief valve and the inside of the container. In this way the volume of air flow into the container is maximized for a given vacuum relief valve cross-sectional area and pressure drop between the outside atmosphere and the pressure in the tank.

In U.S. Pat. No. 2,169,410 a bottom cover plate is lifted to vent pressure in the tank to atmospheric. A vacuum relief valve is provided in this cover plate which moves downwardly to allow air to enter the tank, and which is weighted to control the vacuum relief pressure. However, the volume of air flow is not maximized in this construction.

SUMMARY OF THE INVENTION

The object of the invention is to provide an assembly wherein a vacuum relief valve and a pressure relief valve are both protected from the atmosphere. Another object of the invention is to provide a pressure relief valve and a vacuum relief valve assembly wherein flow into the tank is maximized in the vacuum relief valve.

A vacuum relief valve assembly includes a vacuum valve member located below a top cover plate and is thus protected from the atmosphere. First passageways defined in part by a bottom cover plate provide communication between the outside atmosphere and the lower surface of the valve. Second passageways provide communication between the upper surface of the valve and the inside of the container. When the pressure in the container is below atmospheric, atmospheric pressure acting on the bottom of the valve lifts the valve and air flows through the first and second passageways until atmospheric pressure is reached in the tank. Preferably the cross sectional area of the first and second passageways throughout their length is at least equal to the cross sectional assembly of the vacuum valve to maximize flow into the tank. A pressure relief valve is mounted for pivotal movement relative to an opening which provides fluid communication between the tank and the first passageways. The pressure relief valve may be located in a bottom cover plate or in a vertical or inclined wall. The pressure relief valve is protected from the atmosphere by the top cover plate and in one embodiment by the vacuum relief valve. The combination vacuum relief valve and pressure relief valve are conveniently provided in a hinged hatch cover.

THE DRAWINGS

FIG. 1 is a plan view of the automatic vacuum relief valve of the present invention;

FIG. 2 is a sectional view looking in the direction of the arrows along the line 2—2 in FIG. 1;

FIG. 3 is a sectional view looking in the direction of the arrows along the line 3—3 in FIG. 1;

FIG. 4 is a schematic perspective view of another embodiment of the relief valve, not to scale, with the cover plate shown in phantom, illustrating the openings in the vertical webs.

DESCRIPTION OF PREFERRED EMBODIMENTS

Figure 5:
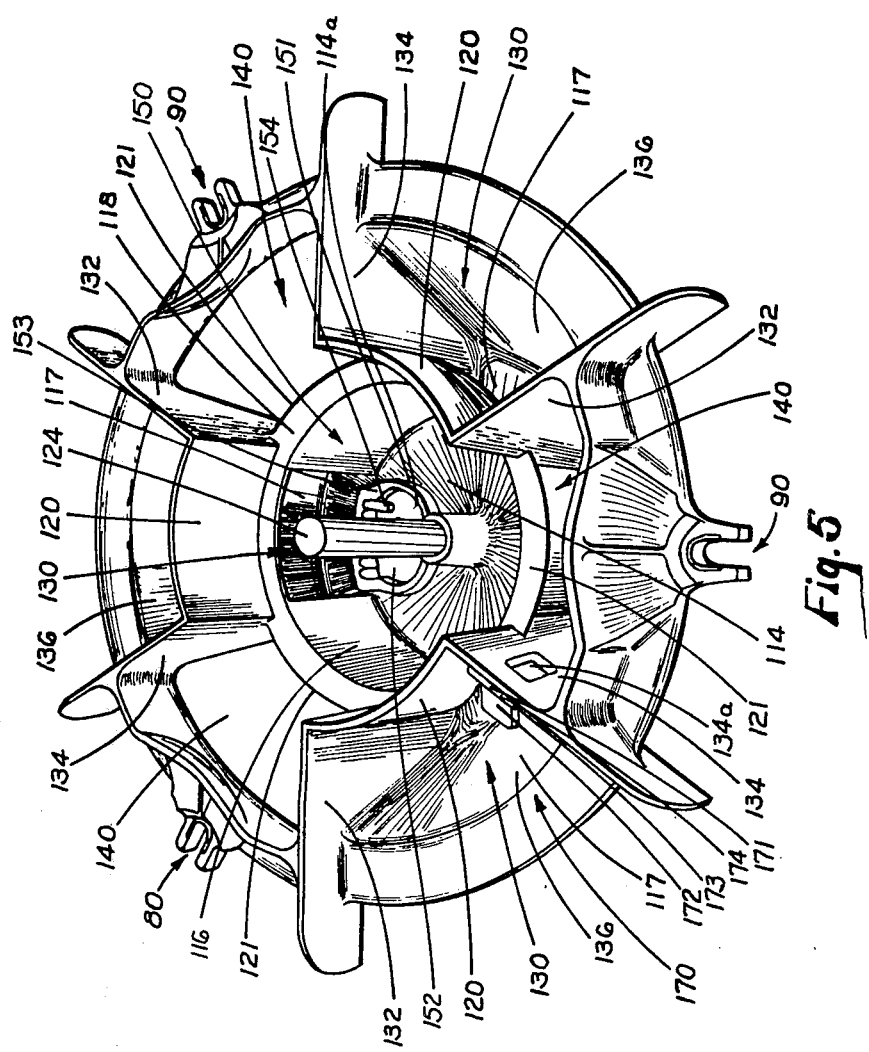
FIG. 5 is a perspective view of the vacuum relief valve of the embodiment shown in FIG. 4 with the valve and cover removed for clarity.

The combination vacuum relief valve and pressure relief valve of the present invention is indicated in the drawings generally at 10. The assembly includes a cover plate 12 and a bottom plate 14 located below the top cover plate. A plurality of vertically extending bottom webs 16 extend upwardly from bottom 14. Webs 16 support a circular valve seat 18 having an opening 19. Top webs 20 depending from the top cover 12 also support valve seat 18. Openings 19 are located between webs 16, and openings 21 are located between webs 20.

A valve 22 is vertically movable about a pin 24 threaded into an opening 26 located in bottom 14. Valve 22 includes an opening 28, and sufficient clearance is provided between the valve and the pin 26 whereby the valve is movable vertically from a closed position shown in FIG. 2 upwardly from its valve seat up as far as the top cover plate 12. Valve 22 is protected by cover plate 22.

A first air passage 30 is defined by bottom extension 32, vertical web 20, a vertical web 34, a vertical web 35 and cover 12. Bottom plate extension 32 is discontinuous about the periphery of bottom plate 14. A second air passage 40 is defined by a vertical web 16, vertical web 42, vertical web 43 and cover plate 12.

Another first air passage 50 is defined by bottom 51, webs 52 and 54 having reduced cross section portions 52a and 54a and cover 12. Similarly, another second air passage 60 is defined by bottom 61, cover 12 and webs 62 and 64. Similar passageways 30, 40, 50, and 60 are located in the other half of the vent.

It is apparent that second air passages 40 and 60 are in communication with the interior of container 66. The preferred container is a railway hopper car or tank car. However, it will be apparent to those skilled in the art that the automatic vent of the present invention is applicable to other transportation containers such as overland trucks and intermodal transit containers, and to silos and industrial bins. The pressure within the container 66 is transmitted through passageways 40, 60 and 21 to the upper surface 22a of the valve 22. Similarly, first air passages 30 and 50 are in communication with atmospheric pressure is thus transmitted to the lower surface 22b of valve 22.

It will thus be apparent that when the pressure within the container is below atmospheric, atmospheric pressure acting on the lower surface 22b of the valve will cause the valve to move vertically upwardly off its seat 18. When this occurs, atmospheric air will pass inwardly through openings 30, upwardly through opening 19 with valve 22 in open position, and then down into the container through passageways 21, 40 and 60. When the pressure within the container again becomes equal to atmospheric pressure, gravity will cause the valve 22 to return to the original seated position.

The cross sectional area throughout the first passageways, the cross sectional area throughout the second passageways are at least equal to the cross sectional area of the valve to maximize the volume of air flow for a given cross sectional area of valve and pressure drop between the outside atmosphere and the inside of the container.

It will be apparent to those skilled in the art that in the situations described above where the pressure within the container acting on the upper surface 22a of the valve 22 is lower than the ambient pressure acting on the lower surface of the valve 22, the valve 22 will automatically open. Air will enter the container through the passageways 30, 50, 19 (with the valve 22 open) and flow down into the container through passageways 21, 40 and 60, and pressure equalization will occur. If desired, a spring 68 may be attached between valve 22 and top 12. The spring is preferably biased into the closed position at a pressure slightly above atmospheric to ensure that the valve 22 will not become cocked in the open position leaving the container continuously open to the atmosphere.

A pressure relief valve 70 is located in an opening 14a in bottom plate 14. A pressure relief valve housing 71 is provided around opening 14a. A pressure relief valve member 72 is pivotably mounted about the housing 71 by means of a pin 73. A torsion spring 74 biases the valve member 72 to the closed position. The torsion spring constant is selected such that pressure in the tank exceeding approximately 0.5 psi above atmospheric will cause valve member 72 to lift, and air and/or vapors to exit through opening 14a. The air and/or vapors then exit through first passageways 30 to the atmosphere. When the pressure in the tank again reaches the design pressure, valve member 22 will again assume the closed position.

It is seen that with the arrangement of the present invention, pressure relief valve 70 is protected by vacuum relief valve 22 and cover plate 12. The vacuum relief valve and pressure relief valve of the present invention are particularly adapted to use in the roof of a railway hopper car, either in an existing hatch or in a separate hatch provided for this purpose, to avoid the need for the operator to climb on the car to open the hatch. Occasionally an operator will forget to do this, prior to unloading, resulting in damage to the car. Furthermore, there is a safety hazard when the operator is climbing on the car, particularly in winter when the roof and ladders are slippery.

Furthermore, if desired, the assembly of the present invention may be made a part of the hatch cover for a hopper car. In this event a hinge 80 is provided including a pair of vertical webs or brackets 82 and 84 which are welded to the car roof 86. A pin 88 passes through the brackets 82 and 84 and formed lugs 83 and 85 provided on the vent. Circumferentially spaced about the vent are closure members 90. The closure members 90 include a pair of vertical webs 92 and 94 which define a slot 96. A suitable latch or locking device 110 is mounted on the car including a wheel 112 threaded on a shaft 114 pivoted about a pin 116, as disclosed in U.S. Pat. No. 3,260,224, which is hereby incorporated into the present application by this reference. This latch is adapted to be slipped within opening 96 and fastened down to hold the vent cover in place.

With the vacuum relief valve, the operator no longer must open a hatch during unloading. The vacuum relief valve protects the car during unloading with a vacuum pneumatic system and due to lading displacement during gravity unloading.

The pressure relief valve protects the car from over pressurization due to fluidization. It is common practice to blow air under positive pressure through the fluidizing membranes on cars so equipped to fluidize dry powdered ladings such as flour for several minutes prior to starting to unload. Thus a pressure relief valve is required if a hatch is not opened and fluidized outlets are used.

A slot 100 is provided in bottom extension 32 and another slot 101 provided in top cover 12 to provide a seal extending continuously about the periphery thereof. Gaskets 102 and 103 inserted into these slots are held in place with a suitable known adhesive. In closed position the seals 102 and 103 engage a conventional hatch coaming 104 of known construction.

The valve member 22 and pressure relief valve 70 may be made of aluminum or plastic. The cover 12 may be made of metal or fiberglass. The bottom 14 and the various ribs described above are preferably made of the same material as the top cover and are conveniently formed in a casting. However, the vent may also be assembled as a fabrication.

Another embodiment of the invention is shown in FIGS. 4 and 5. In this embodiment a top plate 112 shown in phantom in FIG. 4 and a bottom plate 114 shown in FIG. 5 are again provided. Vertical walls 116 again extend upwardly from bottom plate 114. Openings 117 are provided between the vertical walls to define passgeways 130. Upper vertical walls 120 are provided and openings 121 are provided therebetween to define passageways 140. Vertical walls 132 and 134 are provided to separate passageways 130 from passageways 140. In addition, bottom plate 114 extends upwardly at 136 to aid in defining passageways 130. A valve member 122 is mounted about a vertically extending pin 124 with clearance at 128 to allow vertical movement of the valve. A spring (not shown) similar to spring 70 in FIG. 2 may be provided to bias the valve into the closed position. The valve rests upon a valve seat 118 defined by the upper surface of vertical walls 116 and a bottom surface of vertical walls 120 as described in regard to FIG. 2.

The total cross sectional area of the passageways 130 throughout their length is at least equal to the cross sectional area of the valve (less the center portion for the shaft 124), and the total cross sectional area of the passageways 140 throughout their length is also at least equal to the cross sectional area of the valve member 122. Thus for a given cross sectional area of the valve 122 and the given pressure drop between the outside atmosphere and the pressure in the tank in communication with passageways 140, a maximum volume flow of air will occur from the outside atmosphere into the tank.

A pressure relief valve 150 is located in an opening 114a in bottom plate 114. A pressure relief valve housing 151 is provided around opening 114a. A pressure relief valve member 152 is pivotably mounted about the housing 151 by means of a pin 153. A torsion spring 154 biases the valve member 72 to the closed position. The torsion spring constant is selected such that pressure in the tank exceeding about 0.5 psi above atmospheric will cause valve member 152 to lift and air and/or vapors to exit through opening 114a. The air and/or vapors then exit through first passageways 130 to the atmosphere. When the pressure in the tank again reaches the design pressure, valve member 152 will again assume the closed position.

It is seen that with the arrangement of the present invention, pressure relief valve 150 is protected by vacuum relief valve 122 and cover plate 112.

In another embodiment shown in FIG. 5, a pressure relief valve 170 is located in an opening 134a in vertical wall 134. A pressure relief valve housing 171 is provided around opening 134a. A pressure relief valve housing 171 is pivoted around opening 134a. A pressure relief valve member 172 is pivotably mounted about the housing 171 by means of a pin 173. A torsion spring 174 biases the valve member 172 to the closed position. The torsion spring constant is selected such that pressure in the tank exceeding about 0.5 psi above atmospheric will cause valve member 172 to lift and air and/or vapors to exit through opening 134a. The air and/or vapors then exit through first passageways 130 to the atmosphere. When the pressure in the tank again reaches the design pressure, valve member 22 will again assume the closed position.

It is seen that with the arrangement of the present invention, pressure relief valve 170 is protected by cover plate 112.

Closure assemblies 90 are also provided constructed in the same manner as closure members 90 in FIG. 1. They are adapted to receive a latch 110 as shown in FIG. 2.

A hinge 80 may also be provided as described in connection with FIG. 1.

One difference between the embodiments shown in FIGS. 4 and 5 and the embodiment shown in FIGS. 1-3 is that a molded assembly made of plastic is provided in FIGS. 4 and 5 which is less expensive than the cast metal assembly illustrated in FIGS. 1-3.

What is claimed is:

1. A combination vacuum relief valve and pressure relief valve assembly comprising:

a top cover plate closing an opening in a container to the atmosphere; a bottom plate located below said top cover plate; a vacuum relief valve mounted horizontally and spaced below said top cover plate and above said bottom plate; means biasing said vacuum relief valve into closed position engaging a vacuum relief valve seat located below said top cover plate and below said vacuum relief valve and having a vacuum relief valve opening therein; said vacuum relief valve in said closed position closing communication between the inside of the container and the outside atmosphere, and in open position allowing communication between the container and the outside atmosphere; a plurality of first passageways providing fluid communication between the lower surface of said vacuum relief valve and the outside atmosphere; a plurality of second passageways spaced from said first passageways providing fluid communication between the inside of the container and the upper surface of said vacuum relief valve when said valve is in closed position; said first and second passageways being located below said top cover plate; the cross sectional area of said first passageways throughout their length being at least substantially equal to the cross sectional area of said vacuum relief valve opening and the cross sectional area of said second passageways through their length being at least substantially equal to the cross sectional area of said vacuum relief valve opening; whereby when the pressure inside the container becomes less than atmospheric pressure, atmospheric pressure will cause said vacuum relief valve to move upwardly away from its seat and allow air to enter the container and whereby when the pressure in the atmosphere and in the tank are substantially equalized, said vacuum relief valve will return to the seated position; and whereby for a given available valve cross sectional area the volume of air flow into the container from the atmosphere is maximized for a given pressure drop from the atmosphere into the container; a pressure relief valve opening provided in said bottom cover plate between the interior of the tank and said first passageways; a pressure relief valve seat surrounding said opening; a pressure relief valve mounted for movement between open and closed positions relative to said pressure relief valve seat; the cross sectional area of said pressure relief valve being substantially less than the cross sectional area of said vacuum relief valve; whereby in open position pressure from said tank is vented through said first passageways; said pressure relief valve being protected from the atmosphere by said top cover plate.

2. A combination vacuum relief valve and pressure relief valve assembly according to claim 1, wherein said pressure relief valve is located below said vacuum relief valve, and is protected from the atmosphere by said vacuum relief valve.

3. A combination vacuum relief valve and pressure relief valve assembly comprising:

a top cover plate closing an opening in a container to the atmosphere; a bottom plate located below said top cover plate; a vacuum relief valve mounted horizontally and spaced below said top cover plate and above said bottom plate; means biasing said vacuum relief valve into closed position engaging a valve seat located below said top cover plate and below said vacuum relief valve and having a vacuum relief valve seat opening therein; said vacuum relief valve in said closed position closing communication between the inside of the container and the outside atmosphere, and in open position allowing communication between the container and the outside atmosphere; a plurality of first passageways providing fluid communication between the lower surface of said vacuum relief valve and the outside atmosphere; a plurality of second passageways spaced from said first passageways providing fluid communication between the inside of the container and the upper surface of said vacuum relief valve when said valve is in closed position; said first and second passageways being located below said top cover plate; the cross sectional area of said first passageways throughout their length being at least substantially equal to the cross sectional area of said vacuum relief valve opening; and the cross sectional area of said second passageways through their length being at least substantially equal to the cross sectional area of said vacuum relief valve opening; whereby when the pressure inside the container becomes less than atmospheric pressure, atmospheric pressure will cause the vacuum relief valve to move upwardly away from its seat and allow air to enter the container and whereby when the pressure in the atmosphere and in the tank are substantially equalized, said vacuum relief valve will return to the seated position; and whereby for a given available valve cross sectional area the volume of air flow into the container from the atmosphere is maximized for a given pressure drop from the atmosphere into the container; a generally vertical surface located between said tank and said first passageways, a pressure relief valve opening provided in said vertical surface, and a pressure relief valve seat mounted in said pressure relief valve opening; a pressure relief valve mounted for pivotal movement relative to said pressure relief valve opening; said pressure relief valve assuming an open position when the pressure in the tank exceeds a set value, in open position pressure being vented from the tank through said pressure relief valve opening and said first passageways; said pressure relief valve being protected from the atmosphere by said top cover plate.

4. A combination hatch cover, vacuum relief valve, and pressure relief valve comprising:
a top cover plate closing a container opening in a container to the atmosphere; hinge means mounting said cover plate for pivotal movement between open and closed positions relative to said container opening; latch means on said container for holding said top cover plate in said closed position; a bottom cover plate located below said top cover plate; a vacuum relief valve vertically spaced below said top cover plate; means biasing said vacuum relief valve into closed position engaging a vacuum relief valve seat located below said top cover plate and below said vacuum relief valve and having a vacuum relief valve opening therein; said vacuum relief valve in said closed position closing communication between the inside of the container and the outside atmosphere, and in open position allowing communication between the container and the outside atmosphere; a plurality of first passageways providing fluid communication between the lower surface of said vacuum relief valve and the outside atmosphere; a plurality of second passageways spaced from said first passageways providing fluid communication between the inside of the container and the upper surface of said vacuum relief valve when said valve is in closed position; said first and second passageways being located below said top cover plate; the cross sectional area of said first passageways throughout their length being at least substantially equal to the cross sectional area of said vacuum relief valve opening and the cross sectional area of said second passageways through their length being at least substantially equal to the cross sectional area of said vacuum relief valve opening; whereby when the pressure inside the container becomes less than atmospheric pressure, atmospheric pressure will cause said vacuum relief valve to move upwardly away from its seat and allow air to enter the container and whereby when the pressure in the atmosphere and in the tank are substantially equalized, said vacuum relief valve will return to the seated position; and whereby for a given available valve cross sectional area the volume of air flow into the container from the atmosphere is maximized for a given pressure drop from the atmosphere into the container; a pressure relief valve opening provided in said bottom cover plate between the interior of the tank and said first passageways; a pressure relief valve seat surrounding said opening; a pressure relief valve mounted for movement between open and closed positions relative to said pressure relief valve seat; the cross sectional area of said pressure relief valve is substantially less than the cross sectional area of said vacuum relief valve; whereby in open position pressure from said tank is vented through said first passageways; said pressure relief valve being protected from the atmosphere by said top cover plate.

5. A combination hatch cover, vacuum relief valve, and pressure relief valve according to claim 4, wherein said pressure relief valve is located below said vacuum relief valve, and is protected from the atmosphere by said vacuum relief valve.

6. A combination hatch cover, vacuum relief valve, and pressure relief valve according to claim 4, wherein said container is a railway freight car.

7. A combination hatch cover, vacuum relief valve, and pressure relief valve comprising:
a top cover plate closing an opening in a container to the atmosphere; hinge means mounting said cover plate for pivotal movement between open and closed positions relative to said opening; latch means on said container for holding said top cover plate in said closed position; a bottom cover plate located below said top cover plate; a vacuum valve vertically spaced below said top cover plate; means biasing said vacuum relief valve into closed position engaging a valve seat located below said top cover plate and below said vacuum relief valve and having a vacuum relief valve seat opening therein; said vacuum relief valve in said closed position closing communication between the inside of the container and the outside atmosphere, and in open position allowing communication between the container and the outside atmosphere; a plurality of first passageways providing fluid communication between the lower surface of said vacuum relief valve and the outside atmosphere; a plurality of second passageways spaced from said first passageways providing fluid communication between the inside of the container and the upper surface of said vacuum relief valve when said valve is in closed position; said first and second passageways being located below said top cover plate; the cross sectional area of said first passageways throughout their length being at least substantially equal to the cross sectional area of said vacuum relief valve opening; and the cross sectional area of said second passageways through their length being at least substantially equal to the cross sectional area of said vacuum relief valve opening; whereby when the pressure inside the container becomes less than atmospheric pressure, atmospheric pressure will cause the vacuum relief valve to move upwardly away from its seat and allow air to enter the container and whereby when the pressure in the atmosphere and in the tank are substantially equalized, said vacuum relief valve will return to the seated position; and whereby for a given available valve cross sectional area the volume of air flow into the container from the atmosphere is maximized for a given pressure drop from the atmosphere into the container; a generally vertical surface located between said tank and said first passageways, a pressure relief valve opening provided in said vertical surface, and a pressure relief valve seat mounted in said pressure relief valve opening; the cross sectional area of said pressure relief valve seat opening being substantially less than the cross sectional area of said vacuum relief valve; a pressure relief valve mounted for pivotal movement relative to said pressure relief valve opening; said pressure relief valve assuming an open position when the pressure in the tank exceeds a set value, in open position pressure being vented from the tank through said pressure relief valve opening and said first passageways; said pressure relief valve being protected from the atmosphere by said top cover plate.

8. A combination hatch cover, vacuum relief valve, and pressure relief valve according to claim 7, wherein said pressure relief valve opening is formed in a bottom plate, and wherein said pressure relief valve is mounted on said bottom plate.

9. A combination hatch cover, vacuum relief valve, and pressure relief valve according to claim 7, wherein said pressure relief valve opening is formed in a vertical plate, and wherein said pressure relief valve is mounted on said vertical plate adjacent said pressure relief valve opening.

10. A combination hatch cover, vacuum relief valve, and pressure relief valve according to claim 7, wherein said container is a railway freight car.

* * * * *